April 7, 1936.  A. WINTHER  2,036,247
POWER TAKE-OFF
Filed Jan. 31, 1935
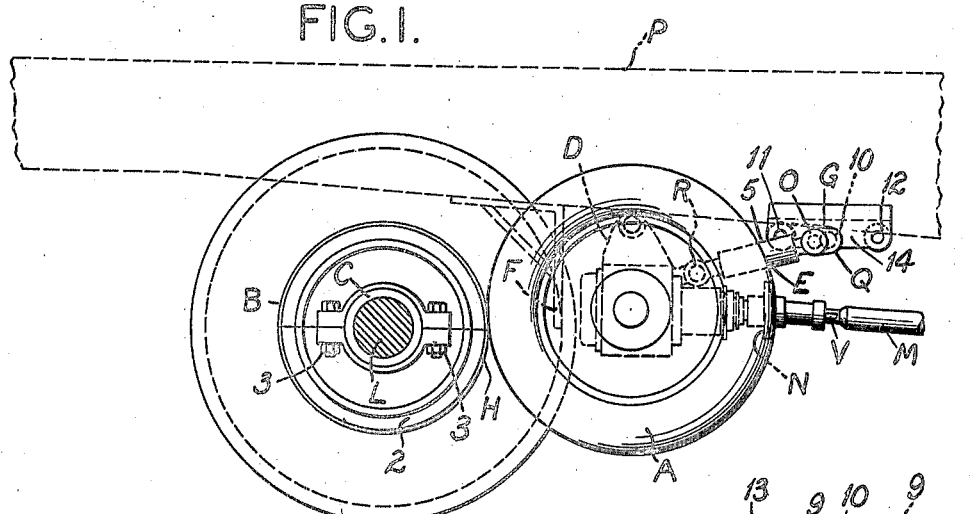
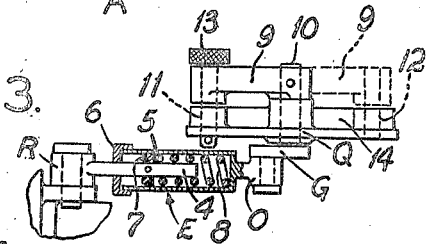
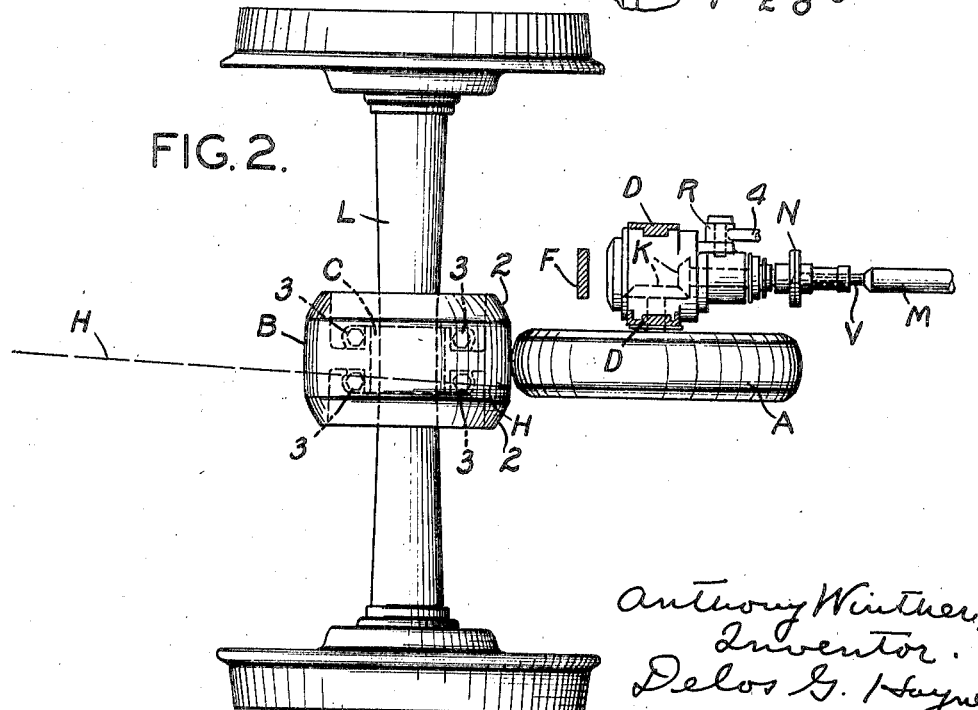
Anthony Winther,
Inventor.
Delos G. Haynes,
Attorney.

UNITED STATES PATENT OFFICE 2,036,247

POWER TAKE-OFF

Anthony Winther, Kenosha, Wis.

Application January 31, 1935, Serial No. 4,210

6 Claims. (Cl. 105—108)

This invention relates to a power take-off, and with regard to certain more specific features, to a power take-off from a live axle such as on a railway car for the purpose of driving auxiliary machinery such as refrigerating apparatus, air conditioning apparatus and the like on the car body.

Among the several objects of the invention may be noted the provision of a power take-off of the class described which is quiet in operation, which will withstand the severe wear to which apparatus of this class is subjected; the provision of apparatus of this class which will remain operative under all conditions of operation, such as when rounding sharp curves, and under conditions of vibration, misalignment and the like; the provision of apparatus of the class described which eliminates the requirement for elaborate operating connections; the provision of apparatus of this class which does not require such constant vigilance on the part of operators as has been called for heretofore, which reduces service and maintenance expenditures, and which is highly dependable and foolproof. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which is illustrated one of various possible embodiments of the invention;

Fig. 1 is a side elevation of the apparatus;

Fig. 2 is a plan view, certain upper portions being removed for purposes of clarity; and, Fig. 3 is an enlarged plan view of a pressure and disconnecting mechanism which is above the plane of Fig. 2.

Similar reference characters indicate corresponding parts throughout the several views of the drawing.

It is well known in making devices to be operated with power from rail car live axles that considerable difficulty results from the severe usage to which the power transmitting means are subjected under such conditions. For example, gear drives, although positive, are frequently noisy, and are subject to severe wear due to the vibration in the axle, small misalignments having injurious effects; belts break frequently or jump off while the car is rounding a curve; and chains are too noisy, and require frequent replacement to prevent failure. Furthermore, all such devices suffer when the rail car moves around sharp curves, requiring elaborate provision of expensive universal connections, and the like to insure successful operation.

Again, the distance between the frame work of the car body and any device mounted on a car axle varies with the load of the car, or may oscillate vertically at relatively high rates when the car passes over irregular rails at high velocities, so as to put unusual stresses and strains on any auxiliary drive hitherto used.

The above named difficulties necessitate constant vigilance on the part of the operators of such devices, calling for large service and maintenance expenditures. As a matter of fact, before my drive was invented, the greatest obstacle to the development of automatic refrigeration for railway freight cars was the requirement for a practical and highly dependable means for driving the refrigeration machinery from the car axle.

The invention described herein provides means for taking power from a live axle such as that of a rail car, without the usual difficulties enumerated above; to provide a drive of relatively low cost, and to eliminate the need for frequent service and inspection.

Referring now more particularly to drawing, the drive will be seen to consist of a tire A, either of the pneumatic or solid type, running against a preferably steel drum B fastened on the rail car axle L. Power from the tire is transmitted through bevel gears K to drive shaft M. The radius H of face of the drum B at the central region is substantially equal to the horizontal distance from the turning axis of the truck to the face of tire A, and the radius of the bevel faces 2 on each side of the drum is such that tire will readily return to normal position after running entirely off the drum while the car is operated on sharp curves, such as are often encountered in switching.

The drum B is split at its center for ease in installation and is securely clamped on the axle by bolts 3. A rubber mounting C between the drum and the axle is provided to offset the usual local unevenness in the cylindrical surface of the axle.

The tire A is suspended by a pivoted hanger D from the car frame P, the pivoting being accomplished, as shown, in a manner such that the tire is permitted to follow the surface of drum B. The hanger is in the form of a gear box which carries bevel gears K for driving the auxiliary drive shaft M through a simple universal or flexible coupling N. A splined connection V between shaft M and coupling N is provided to take care of movement of the gear case as determined by the movement of the tire.

The pressure of tire A against drum B is maintained by an extensible, spring-pressure device E pivoted at O on an eccentric crank G. Eccentric crank G is pivoted to the car body P at Q and to the hanger D at R.

The spring device E consists of a cylinder 5 and this constitutes the member which is pivoted at O. The opposite end of the cylinder has a head 6 through which passes a plunger 4. The plunger 4 is the member pivoted at R. Within the cylinder 5 the plunger 4 is provided with a collar 7 which limits the outward movement. A spring 8 reacts between the closed end of the cylinder 5 and the collar 7 to normally press the collar outwardly so that the tire A is normally pressed against the drum B.

The eccentric crank G is shown in Fig. 1 as being adjusted to a position wherein the pressure device E is tensioned to press the tire A against the drum B. A holding means maintains the eccentric in the position shown. This holding means is composed of an arm 9 fastened to the center pin 10 of said eccentric crank G. Oppositely disposed recesses 11 and 12 are adapted to receive a holding plunger 13 in opposite positions of said arm 9. The recesses 11 and 12 are formed in a body 14 which is fastened to the center sill of the vehicle body P. In the drawing, the spring pressure mechanism is shown in solid lines as being adjusted for contact between the tire and friction drum. The dotted lines show the drawn-off or disconnected position of the arm 9, wherein the tire is drawn away from the drum and positively clears it so that no driving is effected and so that the tire may be removed and replaced if desired.

A stop F is provided to limit the movement of the tire and the gear case in the direction of the car axle when the tire is not bearing against the drum at times when the car is operated on sharp curves, or under like conditions. It will be understood that the contact between the collar 7 and the head 6 would accomplish a similar limited movement, but it is more desirable to have the stronger stop F. The auxiliary shaft M being connected by the universal or flexible joint N and splined connection V, allows for twisting of the car body, vibration, and the necessary "follow-up" movement of the tire in bearing against the drum, as well as to permit drawing the tire away from the drum for replacement.

The tire A is to be placed on a suitable rim by means of which the tire is removed, or a complete spider or wheel upon which it is mounted may be removed for replacement with another or the same tire.

The eccentric plate G provides for disengaging the tire when the car is out of service or where power supply from car axle is not required, or when it is necessary to change a tire A, as mentioned above.

It may readily be seen that my device has many advantages. It is extremely simple and the tire has been found to give long service; it requires little or no servicing, particularly when the solid type of tire is used. One of the principal advantages is the lack of difficulty when the car passes around sharp curves. The face of the drum B being curved so as to have a proper radius H for ordinary curves, no difference is present in tractive effect between the drum and the tire.

On the other hand if the rail curve is very sharp, causing the tire to leave the drum, the bevelled surfaces 2 will "pick up" the tire smoothly and cause the tire to rotate, and "climb back" on the drum without undue scuffing or side wear, and without subjecting the tire and its mounting to unusual side strains. It will be understood that the spring tensioning device E is so designed that its maximum length is such as to bring the contact surface of the tire A onto the drum surface 2 after a sharp turn has been negotiated, and not to permit the tire A to be depressed so far that interference will take place with the bottom corner of the surface 2. This limitation of elongation also results in the ability to entirely remove the tire A from the drum B upon setting the eccentric to the dotted line position shown in Fig. 1 without having the spring means E continue to press said tire against said drum. The stop F further insures that the tire will not be depressed so far that it cannot climb back by way of the beveled regions 2.

Regardless of horizontal or vertical vibration or eccentric movements of the car axle, the spring device E always maintains good contact between the tire and the drum, and even the most severe conditions to which the tire may be subjected in this arrangement are mild as compared with ordinary road wear on tires mounted on automobiles. Furthermore, vertical movement between tire and drum results in a simple rolling action between them, and has no unfavorable effect, either as to wear or driving effect.

By employing standard tire sizes, obtainable anywhere in the country, it is possible in case of need to replace the driven member (the tire) anywhere, and does not require special parts or involve excessive time loss.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. In a vehicle having a body with a live axle pivoted thereto at a predetermined center, and auxiliary machinery on said body, a drive shaft associated with said machinery, a friction drum connected with said axle, a resilient, friction wheel swingably supported on said body, resilient means for normally pressing said friction wheel against said friction drum, and driving means between said wheel and said shaft, said drum having an arcuate face which in a substantially horizontal plane is concentric with the pivot, whereby lateral motion of the wheel thereon is accommodated when the vehicle turns, the face of the drum being further formed at the lateral edges so that upon excessively sharp turns of the vehicle said resilient wheel entirely disengages from the drum but automatically reengages after turning has been completed.

2. In a vehicle having a body and a live axle articulated thereto at a predetermined center, and auxiliary machinery on said body, a drive shaft associated with said machinery, a friction drum connected with said axle, a friction wheel swingably supported on said body, resilient means for normally pressing said friction wheel against said friction drum, driving means between said wheel and said shaft, said drum having a central arcuate face which in a substantially horizontal plane is concentric with said pivot whereby lateral motion of the wheel thereon is accommodated when the vehicle turns, said drum also having beveled lateral regions adapted to effect disengagement and re-engagement between the wheel and drum when the vehicle negotiates a turn of predetermined sharpness, and means for limiting the movement of the wheel toward the drum so that said re-engaging function is possible.

3. In a vehicle having a body and a live axle articulated thereto at a predetermined center, and auxiliary machinery on said body, a drive shaft associated with said machinery, a friction drum connected with said axle, a friction wheel swingably supported on said body, resilient means for normally pressing said friction wheel against said friction drum, driving means between said wheel and said shaft, said drum having a central arcuate face which in a substantially horizontal plane is concentric with said pivot whereby lateral motion of the wheel thereon is accommodated when the vehicle turns, said drum also having beveled lateral regions adapted to effect disengagement and re-engagement between the wheel and drum when the vehicle negotiates a turn of predetermined sharpness, means for limiting the movement of the wheel toward the drum so that said re-engaging function is possible, and handle means for withdrawing the wheel from the drum and maintaining disconnection while mounted.

4. On a vehicle, a live axle, a body, auxiliary machinery on the body to be driven from the live axle, a driving member mounted on the live axle, a driven member connected to said auxiliary machinery, and friction means adapted to convey power from the live axle to said driven member, said friction means being substantially independent of variations in distance between the centers of support for both driving and driven members and comprising a resilient tire, the driving member comprising a drum whose driving surface is curved, the radius of curvature being substantially the same as the distance between said driving surface and the turning center of the vehicle carrying said live axle, the outer edges of said drum being bevelled away from the normal driving surface, so as to facilitate return contact after said driving member and friction means are separated by extreme angular motion of said live axle.

5. On a vehicle, a live axle, a body, auxiliary machinery on the body to be driven from the live axle, a driving member mounted on the live axle, a driven member connected to said auxiliary machinery, friction means adapted to convey power from the live axle to said driven member, said friction means being substantially independent of variations in distance between the centers of support for both driving and driven members and comprising a pneumatic tire, the driving member comprising a drum whose driving surface is curved, the radius of curvature being substantially the same as the distance between said driving surface and the turning center of the vehicle carrying said live axle, the outer edges of said drum being bevelled away from the normal driving surface so as to facilitate return contact after said driving member and the tire are separated by an extreme angular motion of said live axle, and means for disengaging said tire from the friction driving member without removing the driving or driven members or the tire.

6. On a vehicle, a body, a live axle articulated with the body at a predetermined point, means on the body to be driven, means for driving the last-named means comprising a driving member on the live axle, a driven member articulated to the body and connected with said means to be driven, means for engaging the driving and driven members to effect a drive during limited pivotal motion of the live axle with respect to the body and to disconnect the driving and driven members when said limited pivotal motion is exceeded, and means for automatically re-engaging the driving and driven members upon the return of the live axle to a position within said limited range.

ANTHONY WINTHER.